United States Patent
von der Ehe et al.

(10) Patent No.: US 9,399,965 B2
(45) Date of Patent: Jul. 26, 2016

(54) METHOD AND SYSTEM FOR CONTROL OF EMISSIONS IN EXHAUST AFTERTREATMENT SYSTEM

(71) Applicant: General Electric Company, Schenectady, NY (US)

(72) Inventors: James Kristopher von der Ehe, Delafield, WI (US); Maruthi Narasinga Rao Devarakonda, Waukesha, WI (US); Dennis John Spaulding, Waukesha, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 55 days.

(21) Appl. No.: 14/568,580

(22) Filed: Dec. 12, 2014

(65) Prior Publication Data
US 2016/0169135 A1 Jun. 16, 2016

(51) Int. Cl.
*F01N 3/20* (2006.01)
*F02D 41/02* (2006.01)
(Continued)

(52) U.S. Cl.
CPC .......... *F02D 41/0235* (2013.01); *F01N 3/2066* (2013.01); *F01N 11/007* (2013.01); *F01N 3/101* (2013.01); *F01N 3/106* (2013.01); *F01N 3/30* (2013.01); *F01N 13/009* (2014.06); *F01N2430/06* (2013.01); *F01N 2550/05* (2013.01); *F01N 2560/025* (2013.01); *F01N 2560/026* (2013.01); *F01N 2570/18* (2013.01); *F01N 2900/0408* (2013.01); *F01N 2900/1402* (2013.01); *F02D 41/1439* (2013.01); *F02D 41/1454* (2013.01); *F02D 41/1463* (2013.01); *F02D 2250/36* (2013.01); *Y02T 10/47* (2013.01)

(58) Field of Classification Search
CPC ....... F01N 3/101; F01N 3/106; F01N 11/007; F01N 13/009; F01N 2430/06; F01N 2560/025; F01N 2560/026; F01N 2570/18; F01N 2900/0408; F01N 2900/1402; F01N 2900/1616; F02D 41/1439; F02D 41/1454; F02D 41/1463; F02D 2041/1468; F02D 2250/36; Y02T 10/47
USPC .................... 60/274, 276, 285, 286, 299, 307
See application file for complete search history.

(56) References Cited

U.S. PATENT DOCUMENTS 8,087,237 B2  1/2012  Komuro
8,887,490 B2  11/2014  Wentz et al.
(Continued)

FOREIGN PATENT DOCUMENTS

EP  2821609 A1  7/2015

OTHER PUBLICATIONS

U.S. Appl. No. 14/226,934, filed Mar. 27, 2014, Devarakonda et al.
(Continued)

*Primary Examiner* — Jorge Leon, Jr.
(74) *Attorney, Agent, or Firm* — Fletcher Yoder, P.C.

(57) ABSTRACT

A system includes a controller configured to compare a nitrogen oxides ($NO_X$) concentration within treated exhaust gases from a combustion engine after flowing through a first catalyst assembly and a second catalyst assembly relative to a $NO_X$ threshold value, to determine a change in $O_2$ concentration within the treated exhaust gases between the first and second catalyst assemblies upstream of a location of oxidant injection into the treated exhaust gases, and to adjust an air-fuel ratio of the combustion engine based on the change in $O_2$ concentration in the treated exhaust gases if the $NO_X$ concentration is greater than the $NO_X$ threshold value.

20 Claims, 2 Drawing Sheets

(51) Int. Cl.
  *F01N 11/00* (2006.01)
  *F01N 3/30* (2006.01)
  *F01N 13/00* (2010.01)
  *F02D 41/14* (2006.01)
  *F01N 3/10* (2006.01)

(56) References Cited

U.S. PATENT DOCUMENTS

| | | | |
|---|---|---|---|
| 9,057,301 | B2 | 6/2015 | Devarakonda |
| 2010/0000204 | A1 | 1/2010 | Hemsley |
| 2010/0313549 | A1* | 12/2010 | Santoso ................ F02D 37/02 60/285 |
| 2013/0151125 | A1 | 6/2013 | Mann et al. |
| 2013/0312407 | A1* | 11/2013 | Surnilla ................ F01N 3/22 60/605.1 |
| 2014/0079616 | A1* | 3/2014 | Fedeyko ............. B01J 37/0244 423/237 |
| 2014/0223902 | A1* | 8/2014 | Yacoub ................ F01N 3/0821 60/605.1 |

OTHER PUBLICATIONS

EP Search Report; Application No. 15198666.8-1606; May 3, 2016; 6 pages.

* cited by examiner

METHOD AND SYSTEM FOR CONTROL OF EMISSIONS IN EXHAUST AFTERTREATMENT SYSTEM

BACKGROUND

The subject matter disclosed herein relates to an exhaust aftertreatment system for an internal combustion engine and, more specifically, to controlling emissions from the internal combustion engine.

Engines (e.g., internal combustion engines such as reciprocating engines or gas turbines) combust a mixture of fuel and air to generate combustion gases that apply a driving force to a component of the engine (e.g., to move a piston or drive a turbine). Subsequently, the combustion gases exit the engine as an exhaust, which may be subject to exhaust treatment (e.g., aftertreatment) systems that include one or more catalytic converters (e.g., three-way catalyst (TWC) assembly, ammonia slip catalyst (ASC) assembly, etc.) to reduce the emissions of nitrogen oxides ($NO_X$), hydrocarbons (HC), and carbon monoxide (CO). To achieve low emission levels, the catalysts operate within a relatively narrow operating window corresponding to a range of air/fuel mixtures.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes an exhaust aftertreatment system configured to treat emissions from a combustion engine. The exhaust aftertreatment system includes a first catalyst assembly having a first outlet, a second catalyst assembly configured to receive a fluid from the first catalyst assembly, the second catalyst assembly having an inlet and a second outlet, and a fluid conduit disposed between the first catalyst assembly and the second catalyst assembly and configured to transfer the fluid from the first catalyst assembly to the second catalyst assembly. The exhaust aftertreatment system also includes an oxidant injection system coupled to the fluid conduit and configured to inject oxidant into the fluid conduit upstream of the inlet of the second catalyst assembly to provide sufficient oxidant in the fluid flowing into the inlet of the second catalyst assembly to enable catalytic activity in the second catalyst assembly. The exhaust aftertreatment system further includes at least one oxygen ($O_2$) sensor disposed within the fluid conduit downstream of the first outlet of the first catalyst assembly and upstream of both a location of the oxidant injection and the inlet of the second catalyst assembly, wherein the at least one $O_2$ sensor is configured to measure a concentration of $O_2$ within the fluid. The exhaust aftertreatment system yet further includes at least one nitrogen oxides ($NO_X$) sensor disposed downstream of the second outlet of the second catalyst assembly and configured to measure a concentration of $NO_X$ in the fluid exiting the second outlet of the second catalyst assembly. The exhaust aftertreatment system still further includes a controller configured to receive a first signal from at least one $O_2$ sensor representative of the concentration of $O_2$ in the fluid exiting the first outlet of the first catalyst assembly prior to oxidant injection and a second signal from the at least one $NO_X$ sensor representative of the concentration of $NO_X$ in the fluid exiting the second outlet of the second catalyst assembly, and to adjust an air-fuel ratio of the combustion engine based on the first and second signals.

In accordance with a second embodiment, a system includes a controller configured to compare a nitrogen oxides ($NO_X$) concentration within treated exhaust gases from a combustion engine after flowing through a first catalyst assembly and a second catalyst assembly relative to a $NO_X$ threshold value, to determine a change in $O_2$ concentration within the treated exhaust gases between the first and second catalyst assemblies upstream of a location of oxidant injection into the treated exhaust gases, and to adjust an air-fuel ratio of the combustion engine based on the change in $O_2$ concentration in the treated exhaust gases if the $NO_X$ concentration is greater than the $NO_X$ threshold value.

In accordance with a third embodiment, a method is provided for adjusting an air-fuel ratio of a combustion engine. The method includes receiving, at a controller, a first signal from a $O_2$ sensor disposed between a first catalyst assembly and a second catalyst assembly of an exhaust aftertreatment system coupled to the combustion engine, the $O_2$ sensor being disposed upstream of both a location of oxidant injection and an inlet of the second catalyst assembly, wherein the first signal is representative of a concentration of $O_2$ in a fluid exiting a first outlet of the first catalyst assembly prior to oxidant injection. The method also includes receiving, at the controller, a second signal from a nitrogen oxides ($NO_X$) sensor, the $NO_X$ sensor being disposed downstream of a second outlet of the second catalyst assembly, wherein the second signal is representative of a concentration of $NO_X$ in the fluid exiting the second outlet of the second catalyst assembly. The method further includes adjusting, via the controller, an air-fuel ratio of the combustion engine based on a change in $O_2$ concentration in the fluid between the first and second catalyst assemblies upstream of the location of oxidant injection if the $NO_X$ concentration is greater than the $NO_X$ threshold value.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
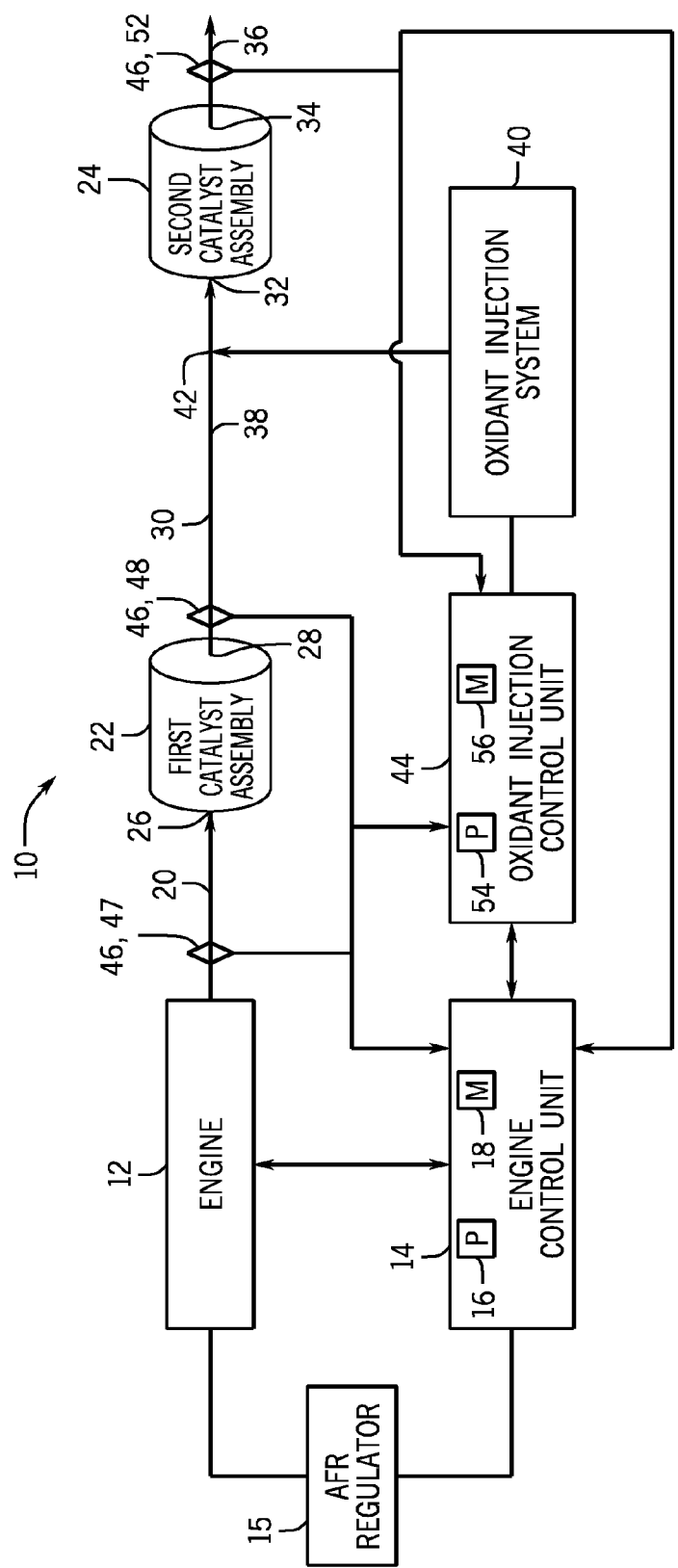
FIG. 1 is a schematic diagram of an embodiment of an exhaust treatment (e.g., aftertreatment) system coupled to an engine.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for adjusting an air-fuel ratio of a combustion engine (e.g., reciprocating internal combustion engine or gas turbine engine). In particular, embodiments of the present disclosures include an aftertreatment system configured to couple to the combustion engine and to treat emissions (e.g., in the engine exhaust) from the combustion engine (e.g., $NO_X$, HC, CO, etc.). The aftertreatment (e.g., exhaust treatment) system may include catalyst based systems, chemical injection systems, or other types. The disclosed embodiments may be used to monitor emissions (e.g., $NO_X$ levels) exiting the aftertreatment system as well changes in oxygen ($O_2$) concentration in mid-bed (i.e., between catalyst assemblies) upstream of injection of an oxidant, while controlling these emissions by adjusting the oxidant-fuel ratio (e.g., air-fuel ratio) of the combustion engine based on the monitored emissions and changes in the mid-bed $O_2$ concentration. The aftertreatment system includes a first catalyst assembly (e.g., TWC assembly or other type of catalyst assembly), and a second catalyst assembly (e.g., ASC assembly or other type of catalyst assembly) that receives a fluid (e.g., treated exhaust flow) from the first catalyst assembly. A fluid conduit is disposed between the first catalyst assembly and the second catalyst assembly that transfers (e.g., enables flow) of the fluid from the first catalyst assembly to the second catalyst assembly. An oxidant injection system (e.g., mid-bed air injection system) is coupled to the fluid conduit and injects an oxidant (e.g., air, $O_2$, oxygen-enriched air, or oxygen-reduced air) into the fluid conduit to provide sufficient oxidant (i.e., enough oxidant to substantially reduce (e.g., approximately 90 to 100 percent) targeted emissions in the second catalyst assembly) in the fluid flowing into an inlet of the second catalyst assembly to enable catalytic activity in the second catalyst assembly.

Multiple transducers or sensors (e.g., $O_2$ sensors and/or $NO_X$ sensors) may be disposed throughout the aftertreatment system (e.g., one or more $O_2$ sensors disposed downstream of the combustion engine and upstream of an inlet of the first catalyst assembly, one or more $O_2$ sensors adjacent an outlet of the first catalyst assembly upstream of the location of oxidant injection, and/or one or more $NO_X$ sensors adjacent an outlet of the second catalyst assembly). A controller (e.g., oxidant injection controller and/or engine controller) is coupled to the oxidant injection system. The controller receives signals from the multiple transducers representative of system parameters (e.g., level or concentration of $O_2$ within fluid (e.g., exhaust) exiting the engine and prior to entering the first catalyst assembly, level or concentration of $O_2$ within fluid exiting the first catalyst assembly prior to oxidant injection, and/or level or concentration of $NO_X$ in the fluid exiting the second catalyst assembly). The controller receives signals from the sensors representative of the level or concentration of $O_2$ within fluid (e.g., exhaust) exiting the engine and prior to entering the first catalyst assembly, the level or concentration of $O_2$ within fluid exiting the first catalyst assembly prior to oxidant injection, and/or the level or concentration of $NO_X$ in the fluid exiting the second catalyst assembly. The controller also adjusts an air-fuel ratio of the combustion engine based on these signals. For example, if $NO_X$ levels are less than or equal to a $NO_X$ threshold value, the controller maintains the air-fuel ratio of the combustion engine. If the $NO_X$ levels are greater than a $NO_X$ threshold value, then the controller increases or decreases the air-fuel ratio based on changes in the $O_2$ concentration in the fluid downstream of the first catalyst assembly but upstream of the location of oxidant injection and the inlet of the second catalyst assembly. In certain embodiments, the controller may utilize minimization control and/or proportional control algorithms in adjusting the air-fuel ratio of the combustion engine. By monitoring the changes in the $O_2$ concentration in the fluid downstream of the first catalyst assembly but upstream of the location of oxidant injection and the inlet of the second catalyst assembly (e.g., mid-bed) and the $NO_X$ concentration in the fluid exiting the second catalyst, the amount of air-fuel ratio control adjustment may be reduced via minimization (e.g., without having to control to a fixed set point or threshold), while also reducing emissions (e.g., $NO_X$ emissions).

Turning now to the drawings and referring to FIG. 1, a schematic diagram of an aftertreatment system 10 coupled to an engine 12 is illustrated. As described in detail below, the disclosed aftertreatment system 10 monitors the emissions (e.g., $NO_X$ level) in the aftertreatment system as well as mid-bed $O_2$ concentration in a fluid (e.g., treated exhaust of the engine 12) and regulates or adjusts an air-fuel ratio of the engine 12 based on the levels of emissions and mid-bed $O_2$ concentration. The engine 12 may include an internal combustion engine such as a reciprocating engine (e.g., multi-stroke engine such as two-stroke engine, four-stroke engine, six-stroke engine, etc.) or a gas turbine engine. The engine 12 may operate on a variety fuels (e.g., natural gas, diesel, syngas, gasoline, blends of fuel (e.g., methane, propane, ethane, etc.), etc.). The engine 12 may operate as a rich-burn engine. The engine 12 may be part of a power generation system that generates power ranging from 10 kW to 10 MW. In some embodiments, the engine 12 may operate at less than approximately 1800 revolutions per minute (RPM). In some embodiments, the engine 12 may operate at less than approximately 2000 RPM, 1900 RPM, 1700 RPM, 1600 RPM, 1500 RPM, 1400 RPM, 1300 RPM, 1200 RPM, 1000 RPM, or 900 RPM. In some embodiments, the engine 12 may operate between approximately 800-2000 RPM, 900-1800 RPM, or 1000-1600 RPM. In some embodiments, the engine 12 may operate at approximately 1800 RPM, 1500 RPM, 1200 RPM, 1000 RPM, or 900 RPM. Exemplary engines 12 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The engine 12 is coupled to an engine control unit (e.g., controller) 14 that controls and monitors the operations of the engine 12. For example, the engine control unit 14 (in conjunction with or separately from an oxidant injection control unit 44) regulates or adjusts an oxidant-fuel ratio (e.g., air-fuel ratio) of the engine 12 as described in greater detail below via one or more air-fuel ratio (AFR) regulators 15 coupled to the engine 12. The AFR is the mass ratio of air to fuel. The engine control unit 14 includes processing circuitry (e.g., processor 16) and memory circuitry (e.g., memory 18). The processor 16 may execute instructions to carry out the operation of the engine 12. These instructions may be encoded in programs or code stored in a tangible non-transitory computer-readable medium (e.g., an optical disc, solid state device, chip, firmware) such as the memory 18.

During operation, the engine 12 generates combustion gases 20 used to apply a driving force to a component of the engine 12 (e.g., one or more pistons reciprocating in cylinders or one more turbines). The combustion gases 20 subsequently exit the engine 12 as an exhaust 20, which includes a variety of emissions (e.g., $NO_X$, HC, CO, etc.). The exhaust treatment system 10 treats these emissions to generate milder emissions (carbon dioxide ($CO_2$), water, etc). As depicted, the exhaust treatment system 10 includes catalytic converters or catalysts assemblies, such as the first catalyst assembly 22 (e.g., TWC assembly or other catalyst assembly that reduces one or more emissions within the exhaust 20) and the second catalyst assembly 24 (e.g., ASC assembly or other catalyst that reduces one or more emissions within the exhaust 20). In certain embodiments, the first and second catalyst assemblies 22, 24 may be housed within a single housing. In embodiments that include the TWC assembly and the ASC assembly, the engine 12 may be operated as a rich-burn engine (e.g., equivalence ratio (i.e., ratio of actual AFR to stoichiometric AFR), or lamba ($\lambda$), value of less than 1.0 such as approximately 0.999, 0.998, 0.997, 0.996, 0.995, 0.994, 0.993, 0.980, 0.970, 0.960, 0.950, or any other value less than 1.0) to maximize the catalytic activity in both the TWC assembly and the ASC assembly. The TWC assembly, via its catalytic activity, reduces $NO_X$ via multiple reactions. For example, $NO_X$ may be reduced via CO to generate $N_2$ and $CO_2$, $NO_X$ may be reduced via $H_2$ to generate $NH_3$ and water, and $NO_X$ may be reduced via a hydrocarbon (e.g., $C_3H_6$) to generate $N_2$, $CO_2$, and water. The TWC assembly also oxidizes CO to $CO_2$, and oxidizes unburnt HC to $CO_2$ and water. A by-product of the reduction of $NO_X$ in the TWC assembly can be the emission of $NH_3$ (e.g., due to the reaction of $NO_X$ and $H_2$). In certain embodiments, instead of the TWC assembly, any catalytic converter that reduces $NO_X$ may be utilized. The ASC assembly, via its catalytic activity (e.g., at zeolite sites), selectively reduces the $NH_3$ to $N_2$. In certain embodiments, the ASC assembly also oxidizes CO to $CO_2$.

The first catalyst assembly 22 includes an inlet 26 to receive the exhaust 20 from the engine 12 and an outlet 28 to discharge a fluid 30 (e.g., treated engine exhaust). The second catalyst assembly 24 includes an inlet 32 to receive the fluid 30 (e.g., including the treated engine exhaust and/or injected oxidant (e.g., air, O2, oxygen-enriched air, or oxygen-reduced air)) and an outlet 34 to discharge an additionally treated fluid 36. A fluid conduit 38 is disposed between the first catalyst assembly 22 and the second catalyst assembly 24. Specifically, the fluid conduit 38 is coupled to the outlet 28 of the first catalyst assembly 22 and the inlet 32 of the second catalyst assembly 24, thus, coupling both assemblies 22, 24 to enable fluid communication between them. The fluid conduit 38 enables the flow or transfer of the fluid 30 from the first catalyst assembly 22 to the second catalyst assembly 24.

As depicted, an oxidant injection system 40 (e.g., mid-bed air injection system) is coupled to the fluid conduit 38. The oxidant injection system 40 injects oxidant (e.g., air, $O_2$, oxygen-enriched air, or oxygen-reduced air) into the fluid 30 within the fluid conduit 38 at a point or location 42 downstream of the outlet 28 of the first catalyst assembly 22 and upstream of the inlet 32 of the second catalyst assembly 24. In certain embodiments, oxidant injection via the oxidant injection system 40 may be actively driven via a pump or injector. In other embodiments, oxidant injection via the oxidant injection system 40 may occur via passive entrainment. The oxidant injection system 40 injects sufficient oxidant in the fluid 30 to enable the catalytic activity in the second catalyst assembly 24.

An oxidant injection control unit 44 (e.g., processor-based controller) controls an amount of oxidant injected by the oxidant injection system 40 into the fluid 30 prior to flowing into the inlet 32 of the second catalyst assembly 24. The oxidant injection control unit 44 includes processing circuitry (e.g., processor 54) and memory circuitry (e.g., memory 56). The processor 54 may execute instructions to control the amount of oxidant injected by the oxidant injection system 40. These instructions may be encoded in programs or code stored in a tangible non-transitory computer-readable medium (e.g., an optical disc, solid state device, chip, firmware) such as the memory 56. As depicted, the oxidant injection control unit 44 is coupled to the engine control unit 14. In certain embodiments, the engine control unit 14 and the oxidant injection control unit 44 may form a single control unit. In certain embodiments, the engine control unit 14 and the oxidant injection control unit 44 may perform some or all of the same functions with regard to the engine 12 and/or the oxidant injection system 40.

The exhaust treatment system 10 includes a plurality of transducers or sensors 46 disposed throughout the system 10 to measure systems parameters (e.g., $O_2$ concentration in exhaust gases generated by the engine 12 and emissions concentration (e.g., $NO_R$, CO, HC), etc.) and to provide feedback (e.g., via signals representative of the system parameters) to the oxidant injection control unit 44 and/or the engine control unit 14. For example, one or more $O_2$ or $\lambda$ sensors 47 may be disposed downstream of the engine but upstream of the first catalyst assembly 22. The one or more $O_2$ sensors 47 measure a concentration of $O_2$ in the exhaust 20 prior to treatment. One or more $O_2$ or $\lambda$ sensors 48 may be also disposed with the fluid conduit 38 downstream of the engine 12 and between the first catalyst assembly 22 and the second catalyst assembly 24. The one or more $O_2$ sensors 48 are also disposed upstream of the location 42 of oxidant injection into the fluid conduit 38. The one or more $O_2$ sensors 48 measure a concentration of $O_2$ in the fluid 30 downstream of the first catalyst assembly 22 and upstream of both the location 42 of oxidant injection and the second catalyst assembly 24. The sensors 46 also include one or more $NO_X$ sensors 52 disposed adjacent or proximal (e.g., downstream of) the outlet 34 of the second catalyst assembly 24. The one or more $NO_X$ sensors 52 measure an amount, concentration, or level of $NO_X$ (e.g., in ppm) in the fluid 36.

Based at least on feedback from the one or more $O_2$ sensors 47, 48 and the one or more $NO_X$ sensors 52, the oxidant injection control unit 44 and/or the engine control unit 14 regulate or adjust an air-fuel ratio of the engine 12. For example, the control units 14, 44 may compare the measured $NO_X$ concentration (e.g., received from $NO_X$ sensors 52) in the fluid 36 to a $NO_X$ threshold value to determine if the air-fuel ratio of the engine 12 needs to be adjusted. The $NO_X$ threshold value may be determined empirically. One or more $NO_X$ threshold values may be stored on the memories 16, 56. If the measured $NO_X$ concentration is less than or equal to the $NO_X$ threshold value, the control units 14, 44 maintain the air-fuel ratio of the engine 12. If the measured $NO_X$ concentration is greater than the $NO_X$ threshold value, the control units 14, 44 alter or change the air-fuel ratio of the engine 12. For example, the controls units 14, 44 alter or change the air-fuel ratio of the engine 12 based on changes in $O_2$ concentration (e.g., based on the measurements received from $O_2$ sensors 48) of the fluid 30 downstream of the first catalyst assembly 22 and upstream of both the location 42 of oxidant injection and the second catalyst assembly 24. The change in $O_2$ concentration may be determined by subtracting a previous $O_2$ concentration measurement (e.g., immediate previous measurement, average of previous measurements, filtered previous measurements, etc.) and the current $O_2$ concentration measurement received from the $O_2$ sensors 48. If the change in $O_2$ concentration is negative or less than zero, the control units 14, 44 increase the air-fuel ratio of the engine 12 (making the mixture of air and fuel leaner (i.e., increase the amount of air relative to fuel or decrease the amount of fuel relative to air)). If the change in $O_2$ concentration is positive or greater than zero, the control units 14, 44 decrease the air-fuel ratio of the engine 12 (making the mixture of air and fuel richer (i.e., decrease the amount of air relative to fuel or increase the amount of fuel relative to air). In certain embodiments, if the change in $O_2$ concentration is zero, the control units 14, 44 may increase the air-fuel ratio of the engine 12. In other embodiments, if the change in $O_2$ concentration is zero, the control units 14, 44 may decrease the air-fuel ratio of the engine 12. In some embodiments, if the change in $O_2$ concentration is zero, the control units 14, 44 may maintain the air-fuel ratio of the engine 12. In certain embodiments, the $O_2$ concentration (e.g., based on the measurements received from $O_2$ sensors 47) in the exhaust 20 may also be utilized by the control units 14, 44 to alter or change the air-fuel ratio of the engine 12. The control units 14, 44 may utilize a minimization control algorithm to regulate or adjust the air-fuel ratio (e.g., without controlling the air-fuel ratio of the engine to a fixed set point or threshold). The adjustments to the air-fuel ratio of the engine 12 by the control units 14, 44 may be done in a stepped or proportional manner. In certain embodiments, the control units 14, 44 may utilize a proportional control algorithm to adjust the air-fuel ratio. Control of the air-fuel ratio of the engine 12 may be done via control of one or more AFR regulators 15 coupled to the engine 12. Each AFR regulator 15 may be a fuel system, carburetor, fuel injector, fuel pass regulator, any system including one or more of these, or any combination thereof.

Figure 2:
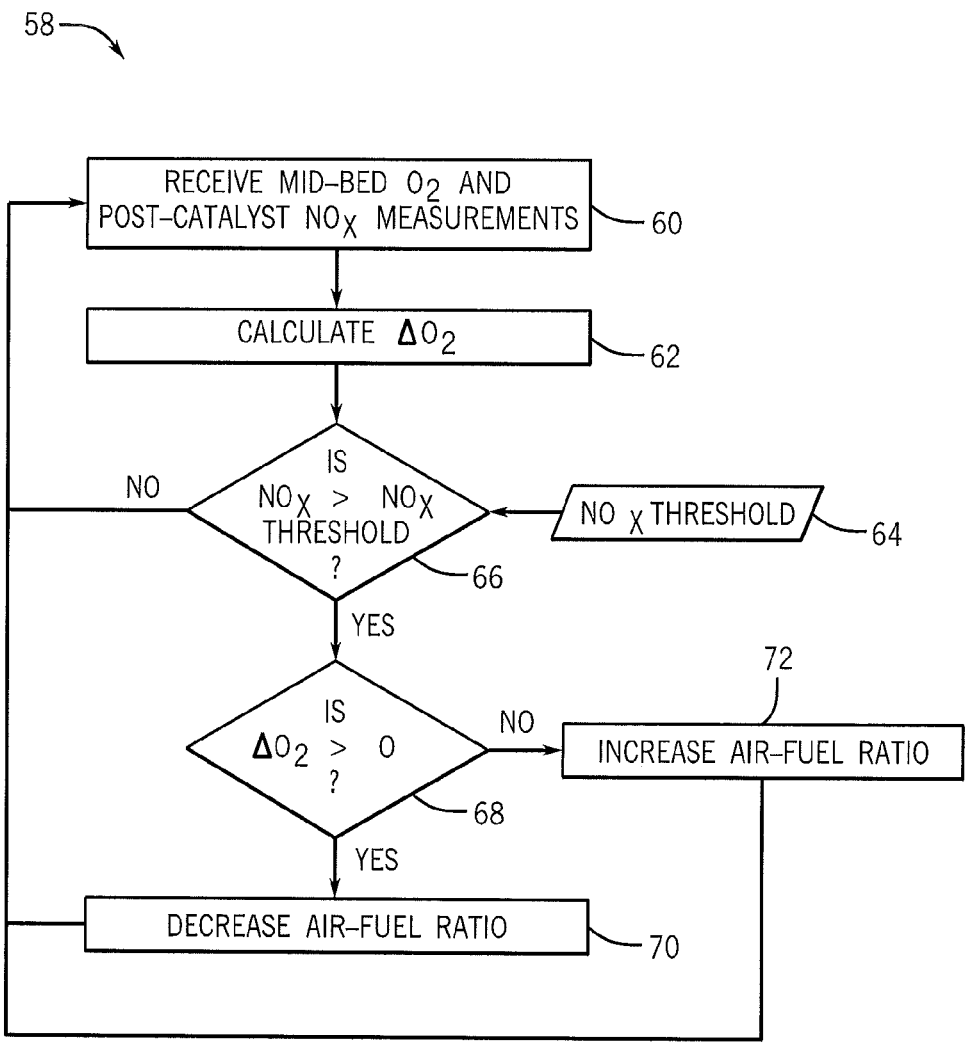
FIG. 2 is a flow chart of an embodiment of a computer-implemented method for regulating an air-fuel ratio of the engine in FIG. 1.

FIG. 2 is a flow chart of an embodiment of a computer-implemented method 58 for regulating an air-fuel ratio of the engine 12 in FIG. 1. All or some of the steps of the method 58 may be executed by the engine control unit 14 and/or the oxidant injection control unit 44 (e.g., utilizing the processors 16, 54 to execute programs and access data and/or algorithms stored on the memories 18, 56). The method 58 includes receiving (e.g., at control units 14 and/or 44) mid-bed $O_2$ concentration measurements and post-catalyst $NO_X$ concentration measurements (block 60). For example, the control units 14, 44 may receive the $O_2$ concentration measurement from one or more $O_2$ sensors 48 disposed downstream of the outlet 28 of the first catalyst assembly 22 and upstream of both the location 42 of oxidant injection and the inlet 32 of the second catalyst assembly 24. In addition, the control units 14, 44 may receive the $NO_X$ concentration measurement from one or more $NO_X$ sensors 52 disposed downstream of the outlet 34 of the second catalyst assembly 24. The method 58 also includes calculating (e.g., via the control units 14, 44) a change in $O_2$ concentration in the fluid 30 downstream of the outlet 28 of the first catalyst assembly 22 and upstream of both the location 42 of oxidant injection and the inlet 32 of the second catalyst assembly 24 based on the feedback from the one or more $O_2$ sensors 48 (block 62). The change in $O_2$ concentration may be determined by subtracting a previous $O_2$ concentration measurement (e.g., immediate previous measurement, average of previous measurements, filtered previous measurements, etc.) and the current $O_2$ concentration measurement received from the $O_2$ sensors 48. The method 58 further includes determining (e.g., via the control units 14, 44) if the measured $NO_X$ concentration received from the one or more $NO_X$ sensors 52 is greater than a $NO_X$ threshold value 64 (block 66). Steps 62 and 66 of the method 58 may be performed simultaneously or either step 62, 66 may be performed prior to the other. If the measured $NO_X$ concentration is less than or equal to the $NO_X$ threshold value 64, the control units 14, 44 continue monitoring mid-bed $O_2$ concentration measurements and post-catalyst $NO_X$ concentration measurements and maintain the air-fuel ratio of the engine 12. If the measured $NO_X$ concentration is greater than the $NO_X$ threshold value 64, the control units 14, 44 determine if the change in $O_2$ concentration is greater than zero (block 68) and adjusts the air fuel ratio (e.g., via one or more AFR regulators 15) of the engine 12 (e.g., utilizing minimization control algorithms and/or proportional control algorithms) based on the change in $O_2$ concentration in the fluid 30 downstream of the outlet 28 of the first catalyst assembly 22 and upstream of both the location 42 of oxidant injection and the inlet 32 of the second catalyst assembly 24. For example, if the change in $O_2$ concentration is less than zero (negative) or equal to zero, then the control units 14, 44 decrease the air-fuel ratio of the engine 12 (making the mixture of air and fuel richer) (block 70). If the change in $O_2$ concentration is greater than zero (positive), then the control units 14, 44 increase the air-fuel ratio of the engine 12 (making the mixture of air and fuel leaner) (block 72).

Technical effects of the disclosed embodiments include providing computer implemented systems and methods for regulating or adjusting the air-fuel ratio. In particular, embodiments include the exhaust treatment system 10 that includes at least one $O_2$ sensor 48 disposed downstream of first catalyst assembly that measures $O_2$ concentration in the fluid 30 upstream of both the location 42 of oxidant injection and the second catalyst assembly 24. The exhaust treatment system 10 also includes at least one $NO_X$ sensor 52 downstream of the second catalyst assembly 24. Based on at least the feedback from the at least one $O_2$ sensor 48 and the at least one $NO_X$ sensor 52, the control units 14, 44 (individually or as a single unit) may determine whether to adjust the air-fuel ratio of the engine 12. In certain embodiments, the control units 14, 44 may utilize minimization control and/or proportional control algorithms in adjusting the air-fuel ratio of the combustion engine. By monitoring the changes in the $O_2$ concentration in the fluid 30 downstream of the first catalyst assembly 22 but upstream of the location 42 of oxidant injection and the inlet 32 of the second catalyst assembly 24 (e.g., mid-bed) and the $NO_X$ concentration in the fluid 36 exiting the second catalyst assembly 24, the amount of air-fuel ratio control adjustment may be reduced via minimization (e.g., without having to control to a fixed set point or threshold), while also reducing emissions (e.g., $NO_X$ emissions).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
an exhaust aftertreatment system configured to treat emissions from a combustion engine, wherein the exhaust aftertreatment system comprises:
a first catalyst assembly having a first outlet;
a second catalyst assembly configured to receive a fluid from the first catalyst assembly, wherein the second catalyst assembly has an inlet and a second outlet;

a fluid conduit disposed between the first catalyst assembly and the second catalyst assembly and configured to transfer the fluid from the first catalyst assembly to the second catalyst assembly;

an oxidant injection system coupled to the fluid conduit and configured to inject oxidant into the fluid conduit upstream of the inlet of the second catalyst assembly to provide sufficient oxidant in the fluid flowing into the inlet of the second catalyst assembly to enable catalytic activity in the second catalyst assembly;

at least one oxygen ($O_2$) sensor disposed within the fluid conduit downstream of the first outlet of the first catalyst assembly and upstream of both a location of the oxidant injection and the inlet of the second catalyst assembly, wherein the at least one $O_2$ sensor is configured to measure a concentration of $O_2$ within the fluid;

at least one nitrogen oxides ($NO_X$) sensor disposed downstream of the second outlet of the second catalyst assembly and configured to measure a concentration of $NO_X$ in the fluid exiting the second outlet of the second catalyst assembly; and a controller configured to receive a first signal from the at least one $O_2$ sensor representative of the concentration of $O_2$ in the fluid exiting the first outlet of the first catalyst assembly prior to oxidant injection and a second signal from the at least one $NO_X$ sensor representative of the concentration of $NO_X$ in the fluid exiting the second outlet of the second catalyst assembly, and to adjust an air-fuel ratio of the combustion engine based on the first and second signals.

2. The system of claim 1, comprising an air-fuel regulator in communication with the controller, wherein the controller is configured to control the air-fuel regulator to adjust the air-fuel ratio of the combustion engine.

3. The system of claim 1, wherein the controller is configured to compare the $NO_X$ concentration within the fluid exiting the second outlet of the second catalyst assembly to a $NO_X$ threshold value.

4. The system of claim 3, wherein the controller is configured to maintain the air-fuel ratio of the combustion engine if the NO concentration is less than or equal to the $NO_x$ threshold value.

5. The system of claim 3, wherein the controller is configured to determine a change in $O_2$ concentration within the fluid exiting the first outlet of the first catalyst assembly prior to oxidant injection.

6. The system of claim 5, wherein the controller is configured to determine the change in $O_2$ concentration by determining a difference between a current $O_2$ concentration measurement and a previous $O_2$ concentration measurement received from the at least one $O_2$ sensor.

7. The system of claim 5, wherein the controller is configured to analyze the change in $O_2$ concentration in determining adjustments to the air-fuel ratio of the combustion engine if the $NO_X$ concentration is greater than or equal to the $NO_X$ threshold value.

8. The system of claim 7, wherein the controller is configured to increase the air-fuel ratio of the combustion engine if the change in $O_2$ concentration is less than or equal to zero.

9. The system of claim 7, wherein the controller is configured to decrease the air-fuel ratio of the combustion engine if the change in $O_2$ concentration is greater than zero.

10. The system of claim 1, wherein the controller is configured to utilize a minimization control algorithm to adjust the air-fuel ratio of the combustion engine based on the first and second signals.

11. The system of claim 1, wherein the controller is configured to utilize a proportional control algorithm to adjust the air-fuel ratio of the combustion engine based on the first and second signals.

12. The system of claim 1, wherein the first catalyst assembly comprises a three-way catalyst (TWC) assembly and the second catalyst assembly comprises an ammonia slip catalyst (ASC) assembly.

13. A system, comprising:
a controller configured to compare a nitrogen oxides ($NO_X$) concentration within treated exhaust gases from a combustion engine after flowing through a first catalyst assembly and a second catalyst assembly relative to a $NO_X$ threshold value, to determine a change in $O_2$ concentration within the treated exhaust gases between the first and second catalyst assemblies upstream of a location of oxidant injection into the treated exhaust gases, and to adjust an air-fuel ratio of the combustion engine based on the change in $O_2$ concentration in the treated exhaust gases if the $NO_X$ concentration is greater than the $NO_X$ threshold value.

14. The system of claim 13, wherein the controller is configured to increase the air-fuel ratio of the combustion engine if the change in $O_2$ concentration is less than zero.

15. The system of claim 13, wherein the controller is configured to decrease the air-fuel ratio of the combustion engine if the change in $O_2$ concentration is greater than zero.

16. The system of claim 13, wherein the controller is configured to receive a first signal representative of the $O_2$ concentration within the treated exhaust gases from an $O_2$ sensor disposed between the first and second catalyst assemblies upstream of the location of oxidant injection, and to receive a second signal representative of the $NO_X$ concentration in the treated exhaust gases after flowing through the first and second catalyst assemblies from a $NO_X$ sensor.

17. The system of claim 13, wherein the controller is configured to maintain the air-fuel ratio of the combustion engine if the $NO_X$ concentration is less than or equal to the $NO_X$ threshold value.

18. A method for adjusting an air-fuel ratio of a combustion engine, comprising:
receiving, at a controller, a first signal from a $O_2$ sensor disposed between a first catalyst assembly and a second catalyst assembly of an exhaust aftertreatment system coupled to the combustion engine, the $O_2$ sensor being disposed upstream of both a location of oxidant injection and an inlet of the second catalyst assembly, wherein the first signal is representative of a concentration of $O_2$ in a fluid exiting a first outlet of the first catalyst assembly prior to oxidant injection;

receiving, at the controller, a second signal from a nitrogen oxides ($NO_X$) sensor, the $NO_X$ sensor being disposed downstream of a second outlet of the second catalyst assembly, wherein the second signal is representative of a concentration of $NO_X$ in the fluid exiting the second outlet of the second catalyst assembly; and adjusting, via the controller, an air-fuel ratio of the combustion engine based on a change in $O_2$ concentration in the fluid between the first and second catalyst assemblies upstream of the location of oxidant injection if the $NO_X$ concentration is greater than a $NO_X$ threshold value.

19. The method of claim 18, comprising increasing the air-fuel ratio of the combustion engine if the change in $O_2$ concentration is less than zero.

20. The method of claim 18, comprising decreasing the air-fuel ratio of the combustion engine if the change in $O_2$ concentration is greater than zero.

\* \* \* \* \*